(12) United States Patent
Ku et al.

(10) Patent No.: US 9,647,980 B2
(45) Date of Patent: May 9, 2017

(54) APPARATUS AND METHODS FOR A SCALABLE COMMUNICATIONS NETWORK

(75) Inventors: Bernard Ku, Austin, TX (US); James W. Forsyth, Royal Oak, MI (US); Lakshminarashimhan Naidu, Pearland, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 13/490,900

(22) Filed: Jun. 7, 2012

(65) Prior Publication Data
US 2013/0329879 A1 Dec. 12, 2013

(51) Int. Cl.
H04L 29/12 (2006.01)
H04M 7/12 (2006.01)

(52) U.S. Cl.
CPC .......... *H04L 61/157* (2013.01); *H04M 7/128* (2013.01); *H04L 61/1511* (2013.01); *H04L 61/605* (2013.01); *H04L 61/609* (2013.01)

(58) Field of Classification Search
None
See application file for complete search history.

(56) References Cited

U.S. PATENT DOCUMENTS

| | | |
|---|---|---|
| 6,839,421 B2 | 1/2005 | Ferraro Esparza et al. |
| 7,274,683 B2 | 9/2007 | Segal |
| 7,277,421 B1 | 10/2007 | Pershan |
| 7,328,281 B2 | 2/2008 | Takeda et al. |
| 7,394,804 B2 | 7/2008 | Miyata et al. |
| 7,502,923 B2 | 3/2009 | Polyhonen et al. |
| 7,529,231 B2 | 5/2009 | Soo et al. |
| 7,796,578 B2 | 9/2010 | Stafford |
| 7,974,295 B2 | 7/2011 | Tuohino et al. |
| 7,996,541 B2 | 8/2011 | Marathe et al. |
| 8,010,793 B2 | 8/2011 | Hoshino et al. |
| 9,015,327 B2 | 4/2015 | Varugheseet al. |

(Continued)

OTHER PUBLICATIONS

Microsoft, "How DNS query works", http://technet.microsoft.com/en-us/library/cc775637(d=printer,v=ws.10).aspx, Jan. 21, 2005.

(Continued)

*Primary Examiner* — Huy D Vu
*Assistant Examiner* — Bao G Nguyen
(74) *Attorney, Agent, or Firm* — Guntin & Gust, PLC; Jay H. Anderson

(57) ABSTRACT

A method that incorporates teachings of the subject disclosure may include, for example, transmitting a first request for an identity of a first regional name authority pointer server of a plurality of regional name authority pointer servers to a national domain name system server responsive to determining that a name authority pointer associated with a telephone number is not stored in cache memory, transmitting a second request for the name authority pointer to the first regional pointer server identified by the domain name system server, where the first regional name authority pointer server corresponds to a geographic region associated with the telephone number, and receiving the name authority pointer from the first regional name authority pointer server. Other embodiments are disclosed.

19 Claims, 9 Drawing Sheets

(56) References Cited

U.S. PATENT DOCUMENTS

| | | | |
|---|---|---|---|
| 2001/0052003 A1* | 12/2001 | Seki | G06F 17/30902 709/219 |
| 2003/0074461 A1* | 4/2003 | Kang | H04L 29/12066 709/230 |
| 2004/0068584 A1 | 4/2004 | Costa-Requena et al. | |
| 2004/0246965 A1 | 12/2004 | Westman et al. | |
| 2005/0027867 A1 | 2/2005 | Mueller et al. | |
| 2005/0286531 A1* | 12/2005 | Tuohino | H04L 29/1216 370/395.2 |
| 2006/0029044 A1* | 2/2006 | Kobayashi et al. | 370/352 |
| 2006/0098621 A1 | 5/2006 | Plata Andres et al. | |
| 2007/0150611 A1 | 6/2007 | Chan et al. | |
| 2008/0019356 A1 | 1/2008 | Marsico | |
| 2009/0010250 A1 | 1/2009 | Ganesan et al. | |
| 2009/0161666 A1* | 6/2009 | Ku | H04L 29/1216 370/356 |
| 2009/0257429 A1 | 10/2009 | Osborn et al. | |
| 2010/0040048 A1 | 2/2010 | Vormisto | |
| 2011/0158236 A1 | 6/2011 | Siegel et al. | |
| 2011/0161505 A1 | 6/2011 | Siegel et al. | |
| 2011/0182287 A1* | 7/2011 | Ku | H04L 27/2613 370/352 |
| 2011/0216762 A1 | 9/2011 | Nas | |
| 2012/0082158 A1 | 4/2012 | Reddy et al. | |
| 2012/0106542 A1 | 5/2012 | Inoue | |
| 2013/0036307 A1 | 2/2013 | Gagliano et al. | |
| 2013/0044644 A1* | 2/2013 | Ku et al. | 370/259 |
| 2013/0132593 A1 | 5/2013 | Westman et al. | |
| 2013/0201999 A1 | 8/2013 | Savolainen et al. | |

OTHER PUBLICATIONS

Schulzrinne, et al., "The Session Initiation Protocol (SIP)", Columbia University, Dept. of Computer Science, May 2001, 137 pages.

\* cited by examiner

100

500

600

- Terminal CD NPA Within Cache

800

- Terminal CD NPA Within Region 1 but not the Cache

900

APPARATUS AND METHODS FOR A SCALABLE COMMUNICATIONS NETWORK

FIELD OF THE DISCLOSURE

The subject relates generally to telecommunications and more specifically to an apparatus and methods for a scalable communications network.

BACKGROUND

As communications technology improves and demand for communication services grows, providers often seek to adjust those systems to incorporate the improved technology and expand those systems to accommodate the growing demand. Systems that are slow to adjust or expand can be undesirable and are often rendered obsolete. Systems that expand by providing unnecessary redundancy are inefficient and costly. Advances in telecommunication technologies create opportunities for integrating communication capabilities as well as challenges for transitioning between technological generations.

BRIEF DESCRIPTION OF THE DRAWINGS

Reference will now be made to the accompanying drawings, which are not necessarily drawn to scale, and wherein.

DETAILED DESCRIPTION

Figure 1:
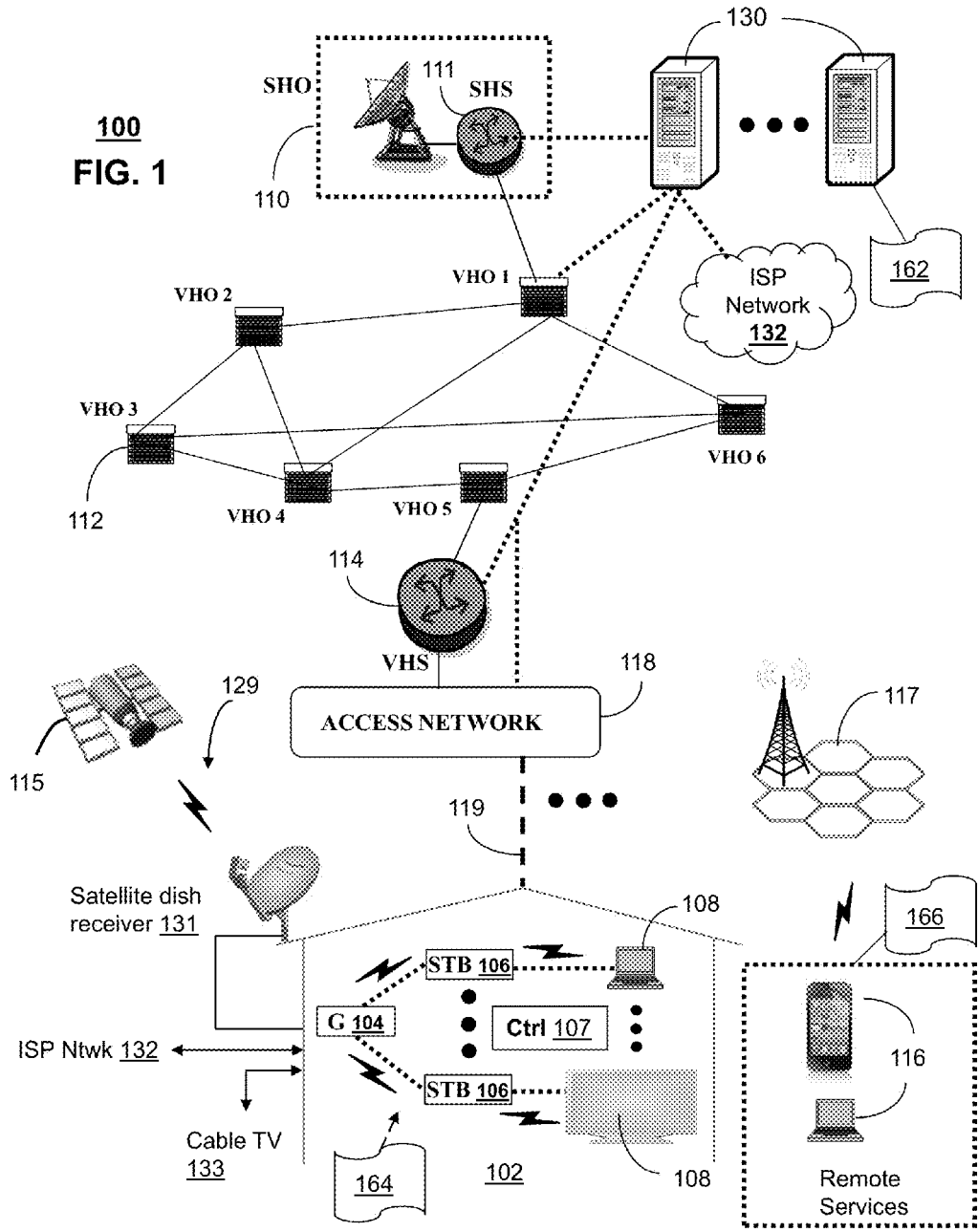
FIGS. 1-2 depict illustrative embodiments of communication systems that provide media services and that perform initiation of voice and messaging communications in a network.

The subject disclosure describes, among other things, illustrative embodiments for scaling a Telephone Number Mapping (ENUM) service in a communications network. Other embodiments are contemplated by the subject disclosure.

One embodiment of the subject disclosure includes a method that can include receiving, at a telephone number mapping (ENUM) server, a first request for a name authority pointer (NAPTR) associated with a telephone number. The method can include determining, at the ENUM server, whether the NAPTR is stored at a cache memory of the ENUM server responsive to receiving the first request and, in turn, receiving, at the ENUM server, the NAPTR stored at the cache memory responsive to determining that the NAPTR is stored at the cache memory. The method can further include transmitting, at the ENUM server, a second request for an identity of a first regional NAPTR server of a plurality of regional NAPTR servers to a domain name system (DNS) server responsive to determining that the NAPTR is not stored at the cache memory. The method can include transmitting, at the DNS server, an identity of the first regional NAPTR server responsive to transmitting the second request, where the first regional NAPTR server corresponds to a geographic region associated with the telephone number. The method can also include transmitting, at the ENUM server, a third request for the NAPTR to the first regional NAPTR server responsive to receiving the identity of the first regional NAPTR server and, in turn, transmitting, at the first regional NAPTR server, the NAPTR to the ENUM server responsive to receiving the third request. The method can also include transmitting, at the ENUM server, the received NAPTR to a call session control function.

One embodiment of the subject disclosure includes a device having a cache memory, a memory storing computer instructions, and a processor coupled to the memory. The processor, responsive to executing the computer instructions, can perform operations for receiving a first request for a name authority pointer (NAPTR) associated with a telephone number. The processor can further perform operations for transmitting a second request for an identity of a first regional NAPTR server of a plurality of regional NAPTR servers to a domain name system (DNS) server responsive to receiving the first request. The processor can further perform operations for receiving the identity of the first regional NAPTR server from the DNS server responsive to transmitting the second request, where the first regional NAPTR server corresponds to a geographic region associated with the telephone number. The processor can also perform operation for transmitting a third request for the NAPTR to the first regional NAPTR server responsive to receiving the identity of the first regional NAPTR server and, in turn, for receiving the NAPTR from the first regional NAPTR server responsive to transmitting the third request.

One embodiment of the subject disclosure includes a computer-readable storage medium, including computer instructions, which when executed by at least one processor cause the at least one processor to perform operations for transmitting a first request for an identity of a first regional name authority pointer server of a plurality of regional name authority pointer servers to a national domain name system server responsive to determining that a name authority pointer associated with a telephone number is not stored in cache memory. The computer instructions can cause the at least one processor to perform operations for transmitting a second request for the name authority pointer to the first regional pointer server identified by the domain name system server, where the first regional name authority pointer server corresponds to a geographic region associated with the telephone number and, in turn, receiving the name authority pointer from the first regional name authority pointer server.

FIG. 1 depicts an illustrative embodiment of a first communication system 100 for delivering media content. The communication system 100 can represent an Internet Protocol Television (IPTV) media system. The IPTV media system can include a super head-end office (SHO) 110 with at least one super headend office server (SHS) 111 which receives media content from satellite and/or terrestrial communication systems. In the present context, media content can represent, for example, audio content, moving image content such as 2D or 3D videos, video games, virtual reality content, still image content, and combinations thereof. The SHS server 111 can forward packets associated with the media content to one or more video head-end servers (VHS) 114 via a network of video head-end offices (VHO) 112 according to a common multicast communication protocol.

The VHS 114 can distribute multimedia broadcast content via an access network 118 to commercial and/or residential buildings 102 housing a gateway 104 (such as a residential or commercial gateway). The access network 118 can represent a group of digital subscriber line access multiplexers (DSLAMs) located in a central office or a service area interface that provide broadband services over fiber optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote controller).

The gateway 104, the media processors 106, and media devices 108 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 106 and subsystems of the IPTV media system for services such as video-on-demand (VoD), browsing an electronic programming guide (EPG), or other infrastructure services.

A satellite broadcast television system 129 can be used also in the media system of FIG. 1. The satellite broadcast television system can be overlaid, operably coupled with, or replace the IPTV system as another representative embodiment of communication system 100. In this embodiment, signals transmitted by a satellite 115 carrying media content can be received by a satellite dish receiver 131 coupled to the building 102. Modulated signals received by the satellite dish receiver 131 can be transferred to the media processors 106 for demodulating, decoding, encoding, and/or distributing broadcast channels to the media devices 108. The media processors 106 can be equipped with a broadband port to the ISP network 132 to enable interactive services such as VoD and EPG as described above.

In yet another embodiment, an analog or digital cable broadcast distribution system such as cable TV system 133 can be overlaid, operably coupled with, or replace the IPTV system and/or the satellite TV system as another representative embodiment of communication system 100. In this embodiment, the cable TV system 133 can also provide Internet, telephony, and interactive media services.

It is contemplated that the subject disclosure can apply to other present or next generation over-the-air and/or landline media content services system.

Some of the network elements of the IPTV media system can be coupled to one or more computing devices 130, a portion of which can operate as a web server for providing web portal services over an Internet Service Provider (ISP) network 132 to wireline media devices 108 or wireless communication devices 116.

Communication system 100 can provide for all or a portion of the computing devices 130 to function as one or more subscriber servers 130. In one embodiment, a subscriber server 130 can use computing and communication technology to perform function 162, which can include, among other things, providing, obtaining, and/or assigning name authority pointers (NAPTR) for use in telephony communications by subscriber communication devices 116 of the communications system 100. In one embodiment, the subscriber server 130 can provide, obtain, and/or assign unique IP addresses to the communication devices 116 of the communication system 100. In turn, each NAPTR used in the communication system 100 can include an IP address for a communication device, e.g. the SIP URI for an IP based Voice enabled device.

In one embodiment, the communication system 100 can include a national telephony system that can be subdivided into a number of geographic regions. In one embodiment, each geographic region of the national telephony system can include a telephone number mapping (ENUM) server and a name authority pointer (NAPTR) server. In one embodiment, the national telephony system can require that call sessions originating in any geographic region inquire at the regional ENUM server to resolve a telephone number for a terminating device to a NAPTR that can include an IP address for that terminating device. In another embodiment, the regional ENUM server can access a local cache memory of recently resolved and transmitted NAPTR records to determine if the terminating device telephone number can be resolved from the cache memory without further database access. In another embodiment, if the appropriate NAPTR for the terminating device is not available at the cache memory, then the regional ENUM server can inquire to a national domain name server for an identity of a regional NAPTR server appropriate for the terminating device telephone number. The national domain name server can provide the identity of the regional NAPTR server from a plurality of NAPTR servers available to the national system. In turn, the ENUM server can inquire to the second name pointer server for the NAPTR appropriate to the telephone number.

In one embodiment, the communication system 100 can distribute NAPTR records for the national telephony system over a series of regional NAPTR servers. In one embodiment, the distributed ENUM service system can reduce the storage and searching requirements for any single NAPTR server device in the system. This decentralization can improve device uptime and reliability while decreasing call resolution processing time. In addition, in one embodiment, a hierarchy of telephone number-to-NAPTR resolution paths can provide efficient number resolution according to a recursive query scheme. In another embodiment, the ENUM resolution paths are scalable. Any geographic region can be split into two or more sub-regions to reduce the number of NAPTR records that must be stored and searched in that geographic region and to improve performance. Recently resolved NAPTR results can be used to provide a highest speed response using the cache memory. Regional calls can be processed using regional resources and smaller databases. National databases can be used, where needed, to resolve telephone numbers outside of the geographic region.

Media processor devices 106 and wireless communication devices 116 of the communication network 100 can be adapted with software functions 164 and 166, respectively, to utilize the services of subscriber server 130.

It is further contemplated that multiple forms of media services can be offered to media devices over landline technologies such as those described above. Additionally, media services can be offered to media devices by way of a wireless access base station 117 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless network technologies are contemplated by the subject disclosure.

Figure 2:
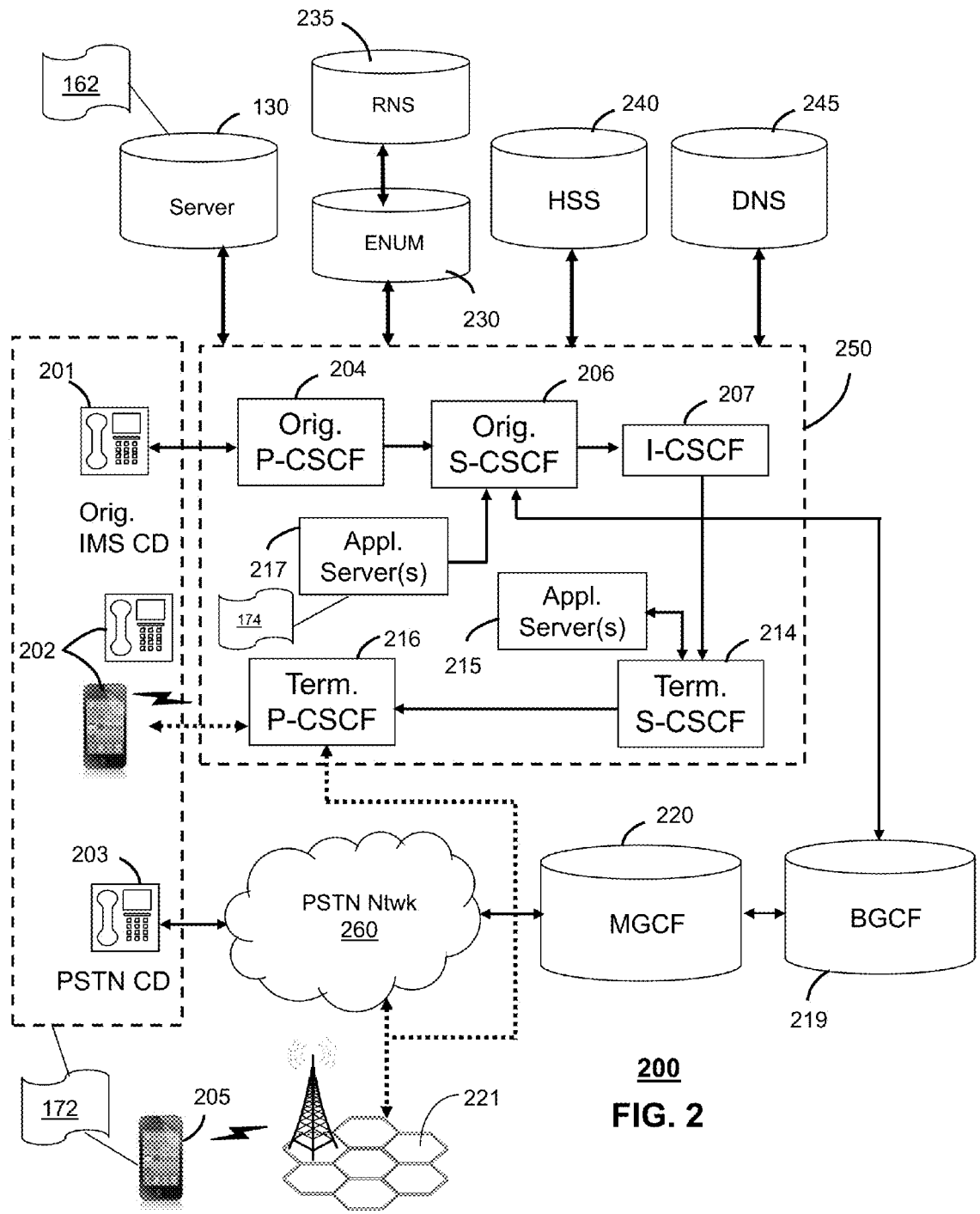

FIG. 2 depicts an illustrative embodiment of a communication system 200 employing an IP Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS-compliant communication devices (CDs) 201, 202, Public Switched Telephone Network (PSTN) CDs 203, 205, and combinations thereof by way of a Media Gateway Control Function (MGCF) 220 coupled to a PSTN network 260. The MGCF 220 need not be used when a communication session involves IMS CD to IMS CD communications. A communication session involving at least one PSTN CD may utilize the MGCF 220.

IMS CDs 201, 202 can register with the IMS network 250 by contacting a Proxy Call Session Control Function (P-CSCF) which communicates with an interrogating CSCF (I-CSCF), which in turn, communicates with a Serving CSCF (S-CSCF) to register the CDs with the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit the SIP INVITE message to one or more application servers (ASs) 217 that can provide a variety of services to IMS subscribers.

For example, the application servers 217 can be used to perform originating call feature treatment functions on the calling party number received by the originating S-CSCF 206 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 206 can submit queries to the ENUM system 230 to translate an E.164 telephone number in the SIP INVITE message to a SIP Uniform Resource Identifier (URI) if the terminating communication device is IMS-compliant. The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE message to the terminating S-CSCF 214. The terminating S-CSCF 214 can then identify a terminating P-CSCF 216 associated with the terminating CD 202. The P-CSCF 216 may then signal the CD 202 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In one embodiment, the communication system 200 can be configured as a national telephony system that can be subdivided into a number of regions. In one embodiment, an ENUM server 230 can be configured as a series of regional ENUM servers. In one embodiment, a regional name pointer server (RNPS) 235 can be configured as a series of regional name pointer servers. In one embodiment, a call session can be initiated at the originating CD 201 at a first geographic region. The originating S-CSCF 206 at the first geographic region can inquire at a regional ENUM server 230 for that first geographic region to seek to resolve a telephone number for a terminating CD 202 to an IP address for the terminating CD 202. In another embodiment, the regional ENUM server 230 can include a local cache memory capable of storing recently resolved NAPTR records. In one embodiment, the regional ENUM server 230 can query its local cache memory to determine if the telephone number can be resolved from the cache memory without further database access.

In another embodiment, if the appropriate NAPTR for the terminating CD 202 is not available at a cache memory, or if no cache memory is available, then the regional ENUM server 230 can determine if a geographic area associated with the telephone number of the terminating CD 202, such as a numbering plan area (NPA), is within the geographic region of the RNPS 235 for the first geographic region. In one embodiment, the regional ENUM server 230 can compare a NPA from the telephone number to determining if this NPA is within the first geographic region. If the telephone number corresponds to a first geographic region call (i.e., is a call from an originating CD 201 in the first geographic region to a terminating CD 202 in the first geographic region), then the ENUM server 230 can inquire to the RNPS 235 for the IP address. If the NPA for the telephone number is found by the ENUM server 230 to not be within the first geographic region, then the regional ENUM server 230 can inquire to a national domain name server (DNS) 245 for an identity of a second RNPS 235 that will contain the NAPTR for the telephone number of the terminating CD 202. The national DNS 245 can provide the identity of the second RNPS 235 and, in turn, the ENUM server can inquire to this second RNPS 235 for the NAPTR appropriate to the telephone number.

In one embodiment, the communication system 200 can distribute NAPTR records for the national telephony system among the RNPS 235. In one embodiment, a subscriber server 130 can provision NAPTR records among the RNPS 235 such that each RNPS 235 only stores and only provides searching services for NAPTR records for telephone numbers corresponding to NPA area codes in the geographic region of the RNPS 235.

In some instances the aforementioned communication process is symmetrical. Accordingly, the terms "originating" and "terminating" in FIG. 2 may be interchangeable. It is further noted that communication system 200 can be adapted to support video conferencing. In addition, communication system 200 can be adapted to provide the IMS CDs 201, 202 with the multimedia and Internet services of communication system 100 of FIG. 1.

If the terminating communication device is instead a PSTN CD such as CD 203 or CD 205 (in instances where the cellular phone only supports circuit-switched voice communications), the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD over the PSTN network 260 to enable the calling and called parties to engage in voice and/or data communications.

It is further appreciated that the CDs of FIG. 2 can operate as wireline or wireless devices. For example, the CDs of FIG. 2 can be communicatively coupled to a cellular base station 221, a femtocell, a WiFi router, a DECT base unit, or another suitable wireless access unit to establish communications with the IMS network 250 of FIG. 2. The cellular access base station 221 can operate according to common wireless access protocols such as Global System for Mobile (GSM), Code Division Multiple Access (CDMA), Time Division Multiple Access (TDMA), Universal Mobile Telecommunications (UMTS), World interoperability for Microwave (WiMAX), Software Defined Radio (SDR), Long Term Evolution (LTE), and so on. Other present and next generation wireless network technologies are contemplated by the subject disclosure. Accordingly, multiple wireline and wireless communication technologies are contemplated for the CDs of FIG. 2.

It is further contemplated that cellular phones supporting LTE can support packet-switched voice and packet-switched data communications and thus may operate as IMS-compliant mobile devices. In this embodiment, the cellular base station 221 may communicate directly with the IMS network 250 as shown by the arrow connecting the cellular base station 221 and the P-CSCF 216.

It is further understood that alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS and ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The subscriber server 130 of FIG. 1 can be operably coupled to the second communication system 200 for purposes similar to those described above. It is further contemplated by the subject disclosure that the subscriber server 130 can perform function 162 and thereby provide NAPTRs for use in telephony communications involving the CDs 201, 202, 203 and 205 of FIG. 2. CDs 201, 202, 203 and 205, which can be adapted with software to perform function 172 to utilize the services of the subscriber server 130. It is further contemplated that the subscriber server 130 can be an integral part of the application server(s) 217 performing function 174, which can be substantially similar to function 162 and adapted to the operations of the IMS network 250.

Figure 3:
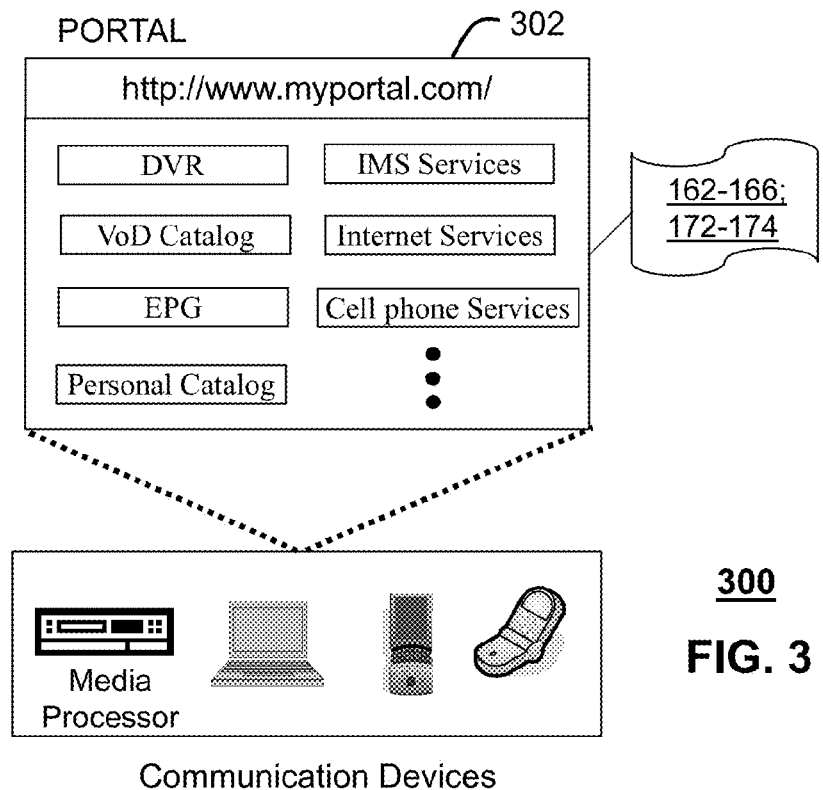
FIG. 3 depicts an illustrative embodiment of a web portal for interacting with the communication systems of FIGS. 1-2.

FIG. 3 depicts an illustrative embodiment of a web portal 302 which can be hosted by server applications operating from the computing devices 130 of the communication system 100 illustrated in FIG. 1. The web portal 302 can be used for managing services of communication systems 100-200. A web page of the web portal 302 can be accessed by a Uniform Resource Locator (URL) with an Internet browser such as Microsoft's Internet Explorer™, Mozilla's Firefox™, Apple's Safari™, or Google's Chrome™ using an Internet-capable communication device such as those described in FIGS. 1-2. The web portal 302 can be configured, for example, to access a media processor 106 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 106. The web portal 302 can also be used for provisioning IMS services described earlier, provisioning Internet services, provisioning cellular phone services, and so on.

It is contemplated by the subject disclosure that the web portal 302 can further be utilized to manage and provision software applications 162-166, and 172-174 to adapt these applications as may be desired by subscribers and service providers of communication systems 100-200.

Figure 4:
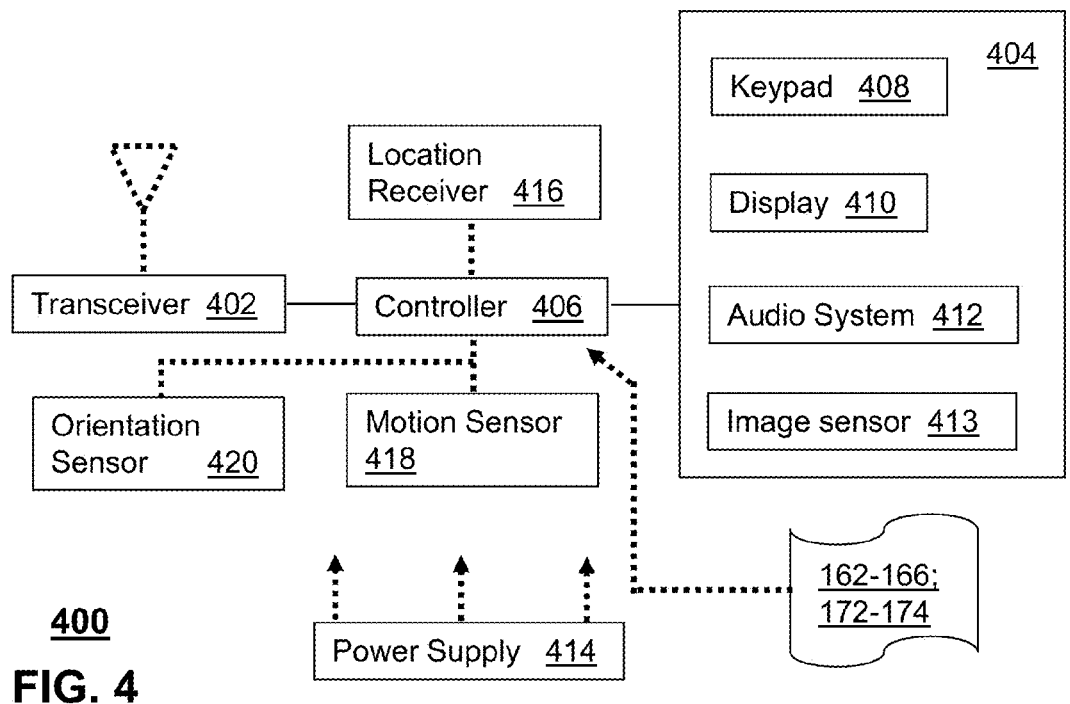
FIG. 4 depicts an illustrative embodiment of a communication device utilized in the communication systems of FIGS. 1-2.

FIG. 4 depicts an illustrative embodiment of a communication device 400. Communication device 400 can serve in whole or in part as an illustrative embodiment of the devices depicted in FIGS. 1-2. The communication device 400 can comprise a wireline and/or wireless transceiver 402 (herein transceiver 402), a user interface (UI) 404, a power supply 414, a location receiver 416, a motion sensor 418, an orientation sensor 420, and a controller 406 for managing operations thereof. The transceiver 402 can support short-range or long-range wireless access technologies such as Bluetooth, ZigBee, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, software defined radio (SDR), Long Term Evolution (LTE), as well as other next generation wireless communication technologies as they arise. The transceiver 402 can also be adapted to support circuit-switched wireline access technologies (such as PSTN), packet-switched wireline access technologies (such as TCP/IP, VoIP, etc.), and combinations thereof.

The UI 404 can include a depressible or touch-sensitive keypad 408 with a navigation mechanism such as a roller ball, a joystick, a mouse, or a navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric keypad commonly used by phones, and/or a QWERTY keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display 410 with navigation features.

The display 410 can use touch screen technology to also serve as a user interface for detecting user input (e.g., touch of a user's finger). As a touch screen display, the communication device 400 can be adapted to present a user interface with graphical user interface (GUI) elements that can be selected by a user with a touch of a finger. The touch screen display 410 can be equipped with capacitive, resistive or other forms of sensing technology to detect much surface area of a user's finger has been placed on a portion of the touch screen display. This sensing information can be used control the manipulation of the GUI elements.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. Alternatively, the charging system can utilize external power sources such as DC power supplied over a physical interface such as a USB port. The location receiver 416 can utilize common location technology such as a global positioning system (GPS) receiver capable of assisted GPS for identifying a location of the communication device 400 based on signals generated by a constellation of GPS satellites, thereby facilitating common location services such as navigation. The motion sensor 418 can utilize motion sensing technology such as an accelerometer, a gyroscope, or other suitable motion sensing to detect motion of the communication device 400 in three-dimensional space. The orientation sensor 420 can utilize orientation sensing technology such as a magnetometer to detect the orientation of the communication device 400 (North, South, West, East, combined orientations thereof in degrees, minutes, or other suitable orientation metrics).

The communication device 400 can use the transceiver 402 to also determine a proximity to a cellular, WiFi, Bluetooth, or other wireless access points by common sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such as Flash, ROM, RAM, SRAM, DRAM or other storage technologies.

Other components not shown in FIG. 4 are contemplated by the subject disclosure. For instance, the communication device 400 can include a reset button (not shown). The reset button can be used to reset the controller 406 of the communication device 400. In yet another embodiment, the communication device 400 can also include a factory default setting button positioned below a small hole in a housing assembly of the communication device 400 to force the communication device 400 to re-establish factory settings. In this embodiment, a user can use a protruding object such as a pen or paper clip tip to reach into the hole and depress the default setting button.

The communication device 400 as described herein can operate with more or less components described in FIG. 4. These variant embodiments are contemplated by the subject disclosure.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

It is contemplated by the subject disclosure that the communication device 400 shown in FIG. 4 or portions thereof can serve as a representation of one or more of the devices of communication systems 100-200. It is further contemplated that the controller 406 can be adapted in various embodiments to perform the functions 162-166 and 172-174, respectively.

Figure 5:
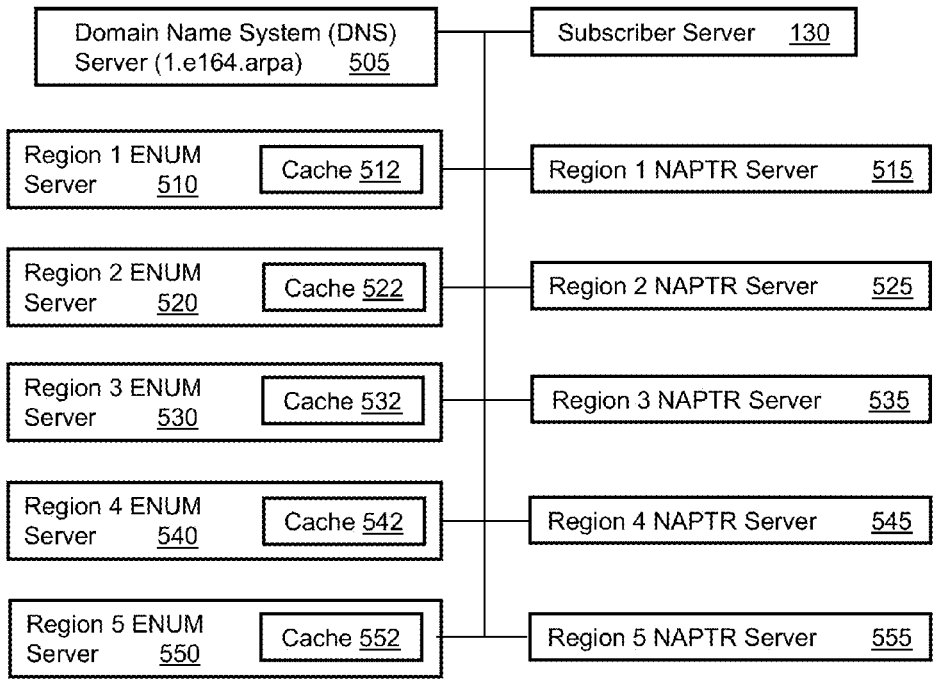
FIG. 5 depicts an illustrative embodiment of the communication system of FIGS. 1-2.

FIG. 5 depicts an illustrative embodiment of the communication system of FIGS. 1-2. In one embodiment, a hierarchical telephone number mapping system 500 for a scalable and decentralized telephone number mapping is shown. In one embodiment, the system 500 includes a national domain name server (DNS) 505 and a series of regional ENUM servers 510-550 and regional NAPTR servers 515-555. In one embodiment, the mapping system 500 is provisioned by a subscriber server 130 that can collect, catalog, and distribute NAPTR records that link telephone numbers to IP addresses for communication devices. In one embodiment, the subscriber server 130 can access telephone number and IP address data for communication devices subscribed for usage on the communication system 100 or for other communication systems that can be accessed from the communication system 100. In one embodiment of the mapping system 500, the regional ENUM servers 510-550 each include local cache memories to temporarily store NAPTR records that have been returned for prior call sessions at the corresponding regional ENUM server.

In one embodiment, the mapping system 500 can be configured so that, for any call session initiated from within the communication system, the call processing is initiated at the regional level. A call initiation results in a query to a regional ENUM server 510 corresponding to the geographic region of the calling CD 201. The regional ENUM server 510 can then provide a NAPTR record associated with the terminating CD 202, according to the telephone number of the terminating CD 202. The regional ENUM server 510 can provide the NAPTR record for the telephone number from one of two sources, a 512 of prior call NAPTRs or a regional NAPTR server 515-555 corresponding to the geographic region of the terminating CD 202.

Figure 6:
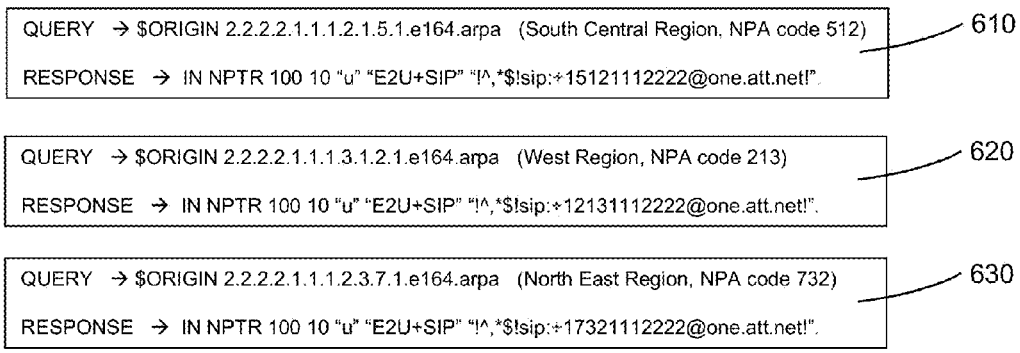
FIG. 6 depicts illustrative embodiments of name authority pointers (NAPTRs) associated with telephone numbers having differing numbering plan area (NPA) codes.

FIG. 6 depicts illustrative embodiments of name authority pointers (NAPTRs) associated with telephone numbers having differing numbering plan area (NPA) codes. In one embodiment, a series of NAPTRs 610 and 630 can be provisioned to any one of the RNPS 515-555. In one embodiment a first NAPTR 610 can include a SIP URI for identifying an address of an internet protocol based service for routing a call to the CD 202 identified by the telephone number "15121112222." A second NAPTR 620 can include another SIP URI for identifying an address of an internet protocol based service for routing a call to the CD 202 identified by the telephone number "12131112222." A third NAPTR 630 can include another SIP URI for identifying an address of an internet protocol based service for routing a call to the CD 202 identified by the telephone number "17321112222." The first NAPTR 610 is directed to a telephone number with a NPA of 512, which corresponds to a South Central geographic region. The second NAPTR 620 telephone number is for a device at NPA code 213, or the West geographic region, while the third NAPTR 630 is for a North East geographic region device with NPA code 732. In one embodiment, the first NAPTR 610 is provisioned to a South Central Regional name pointer server (RNPS), the second NAPTR 620 is provisioned to a West RNPS, and the third NAPTR 630 is provisioned to a North East RNPS.

Figure 7:
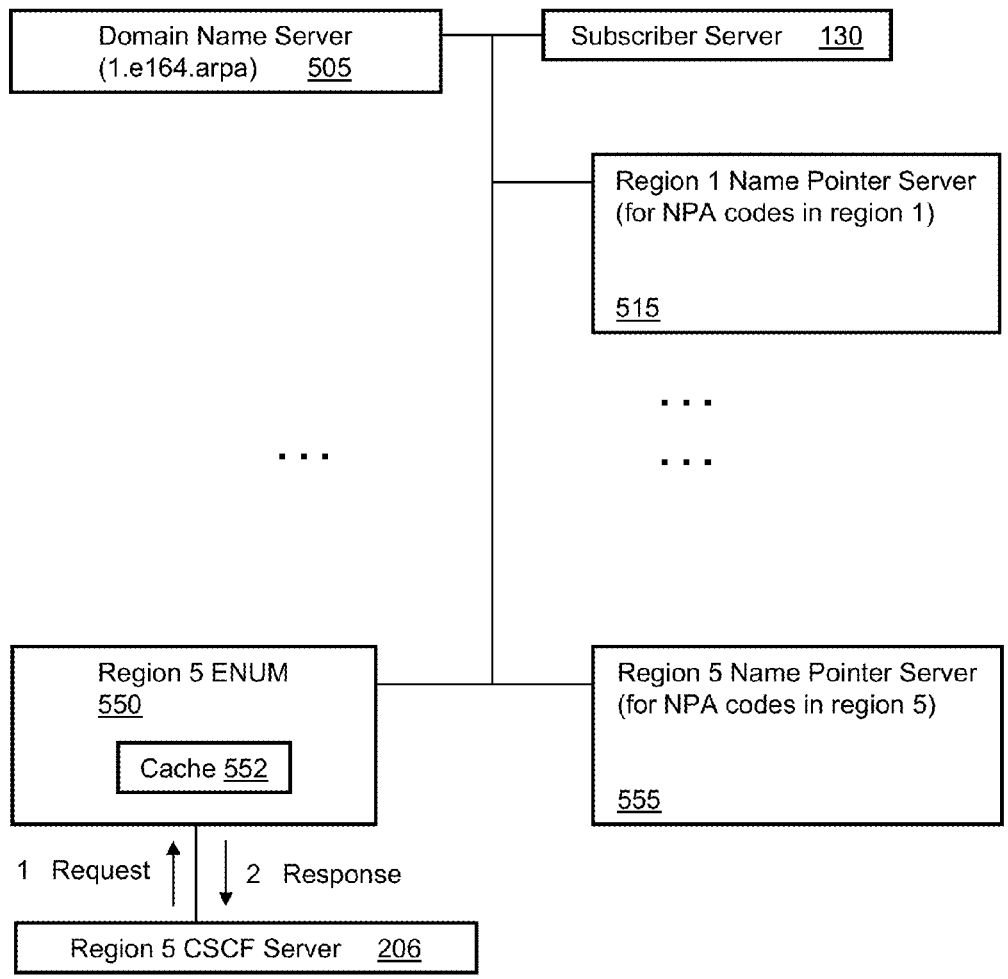
FIGS. 7-9 depict illustrative embodiments of data flow within the communication system of FIGS. 1-2 and 5.
Figure 8:
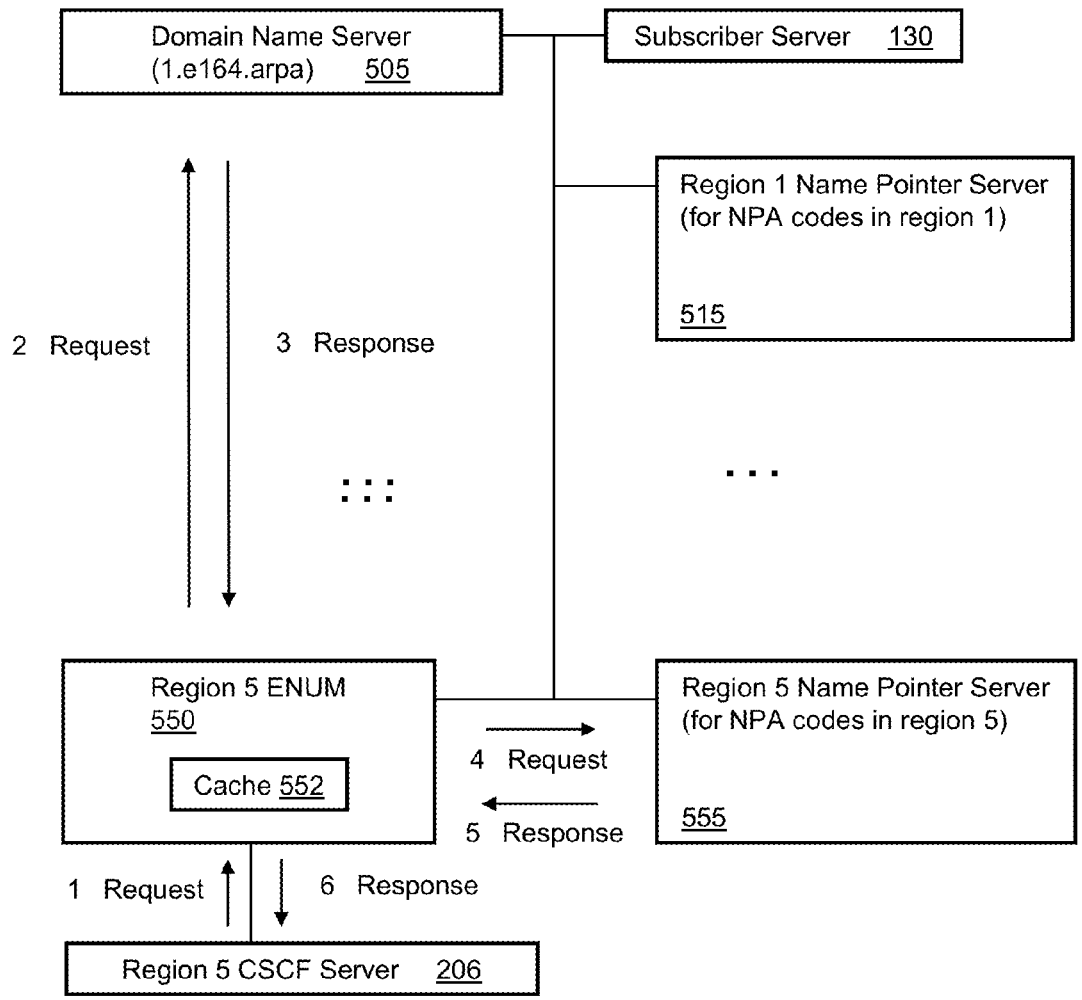
Figure 9:
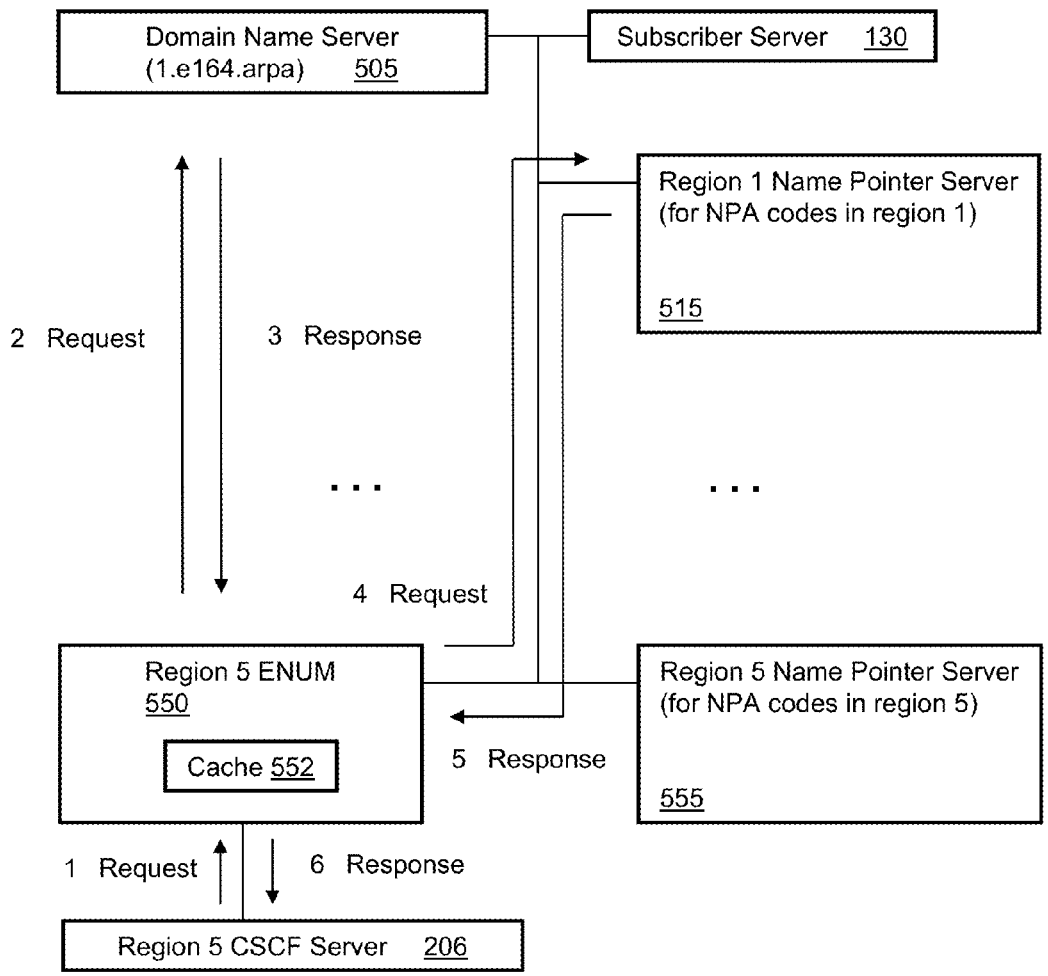

FIGS. 7-9 depict illustrative embodiments of data flow within the communication system of FIGS. 1-2 and 5. Referring to FIG. 7, in one embodiment, a CSCF Server 206 at geographic region 5 can receive a call session initiation protocol (SIP) message from an originating CD 201. The region 5 CSCF server 206 can send a request to the region 5 ENUM server 550 for a mapping of a terminating CD 202 telephone number to an IP address. In response to the request, the region 5 ENUM server 550 can search a local, region 5, cache memory 552 to determine if the cache memory 552 is storing the NAPTR from a previous call. In one embodiment, if the region 5 ENUM 550 finds the NAPTR record in the cache memory 552, then the region 5 ENUM 550 returns the NAPTR in a response to the region 5 CSCF server 206. In one embodiment, the cache memory 552 can store every NAPTR processed through the region 5 ENUM 550. For example, after a NAPTR is returned from the region 5 ENUM server 550 to the region 5 CSCF server 206, then a copy of the NAPTR record is stored in the cache memory 552 to provide a method of quickly processing a subsequent call to the same terminating CD 202. In one embodiment, the cache memory 552 can store NAPTR records for a time period. For example, the cache memory 552 can be configured to store a NAPTR record for one hour after the record is retrieved.

Referring to FIG. 8, the terminating CD 202 of the call session is in the same region as the originating CD 201. In other words, the call session defines a "local call" within region 5. In this case, however, the Geographic region 5 ENUM cache memory 552 does not contain the NAPTR for the telephone number of the terminating CD 202. Therefore, the Geographic region 5 ENUM server 550 can send a request to the Domain Name System (DNS) server 505 for an identity of a regional NAPTR server 515-555 that contains the NAPTR corresponding to the telephone number of the terminating CD 202. In one embodiment, the DNS server 505 can provide identities for every Regional NAPTR server 515-555 in a nationwide system. In one embodiment, the DNS server 505 can determine which geographic region of the system corresponds to the geographic area associated with the telephone number. For example, where the telephone number is within region 5, as in this case, the DNS server 505 can respond by returning an identity for the region 5 NAPTR server 555. In an alternative embodiment, the region 5 ENUM 550 can then send a request to the region 5 NAPTR server 555 for NAPTR corresponding to the terminating CD 202. In one embodiment, the nationwide ENUM service 800 can further segment NAPTR processing by having the regional ENUM server determine if the telephone number is local to the same region and forward the request for the NAPTR directly to a local regional NAPTR server 555 without inquiring to the DNS server 505. For example, the region 5 ENUM server 550 can detect that the a telephone number associated with a NAPTR request corresponds to a terminating CD 202 that is also in region 5. The region 5 ENUM server 550 can then forward a request for the NAPTR directly to a region 5 NAPTR server 555 without a prior inquiry to the DNS server 505.

Referring now to FIG. 9, the terminating CD 202 of the call session is in the a different region the originating CD 201. In this case, again, the Geographic region 5 ENUM cache memory 552 does not contain the NAPTR for the telephone number of the terminating CD 202. The region 5 ENUM server 550 can send a request to the DNS server 505 for an identity of a NAPTR server 515-555 that contains the NAPTR for the termination CD 202. In one embodiment, the DNS server 505 can provide identities for every Regional NAPTR server 515-555 in a nationwide system. In one embodiment, the DNS server 505 can determine which geographic region of the system corresponds to the geographic area associated with the telephone number. For example, if the NPA telephone number is within region 1, then the DNS server 505 can respond by returning an identity for the region 1 NAPTR Server 515 to the region 5 ENUM server 550. In one embodiment, the DNS server 550 can first parse telephone number for an NPA for the terminating CD 202 and then determine a region that corresponds to the NPA. In one embodiment, the region 5 ENUM server 550 can then request the NAPTR for the telephone number from the region 1 NAPTR Server 515. In one embodiment, the region 1 NAPTR Server 515 can respond with the requested NAPTR that can then be forwarded to the region 5 CSCF server 206 that made the initial request.

Figure 10:
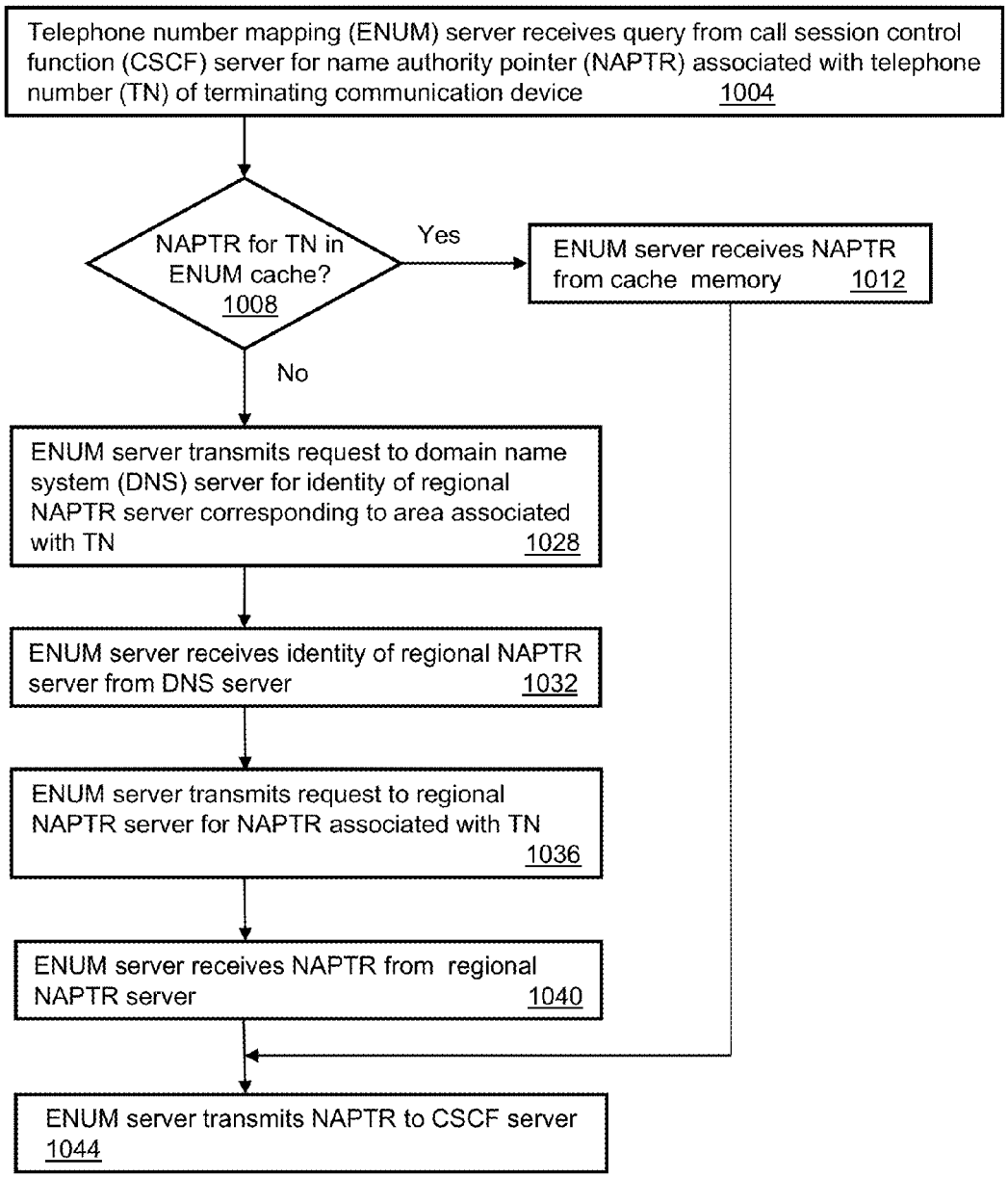
FIG. 10 depicts illustrative embodiments of a method operating in portions of the systems described in FIGS. 1-2, 5, and 7-9.
Figure 11:
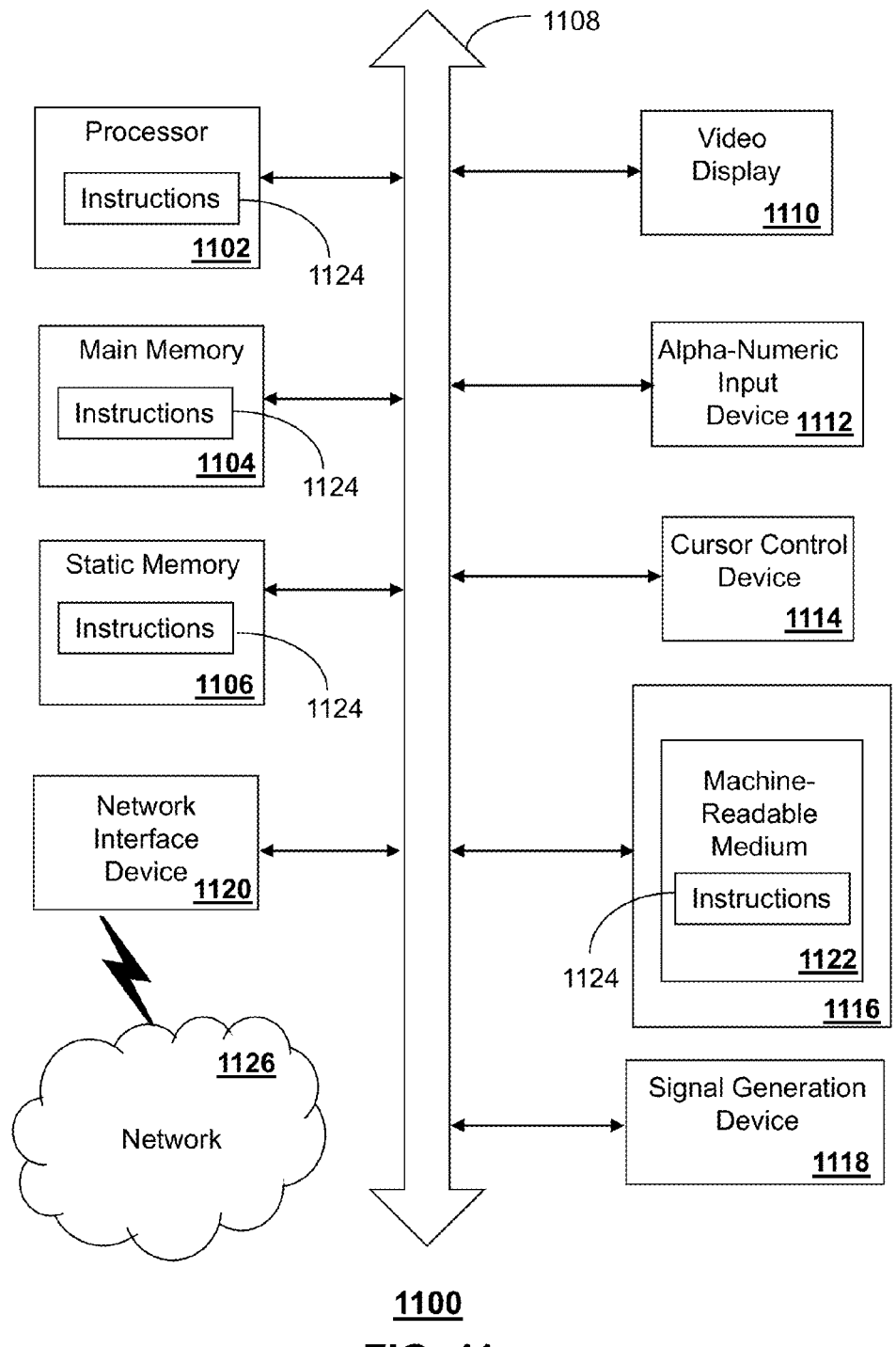
FIG. 11 is a diagrammatic representation of a machine in the form of a computer system within which a set of instructions, when executed, may cause the machine to perform any one or more of the methods described herein.

FIG. 10 depicts an illustrative method 1000 that operates in portions of the devices of FIGS. 1-2, 5, and 7-9. Method 1000 can begin with step 1004 in which, a telephone number mapping (ENUM) server 550 in a first geographic region can receive a query from a call session control function (CSCF) server 206 for a name authority pointer (NAPTR) associated with a telephone number (TN) of a terminating communication device (CD) 202. In one embodiment, the CSCF Server 206 at the first geographic region can receive a call session initiation protocol (SIP) from an originating CD 201. The CSCF server 206 can send a request to the ENUM server 550 of the first geographic region for a mapping of a terminating CD 202 telephone number to an IP address. In step 1008, the ENUM server 550 can search a cache memory 552 at the first geographic region, such as at the ENUM server 550, to determine if the cache memory 552 is storing the NAPTR from a previous call. In one embodiment, the cache memory 552 can store every NAPTR processed through the ENUM server 550. For example, after a NAPTR is returned from the ENUM server 550 to the CSCF server 206, then a copy of the NAPTR record is stored in the cache memory 552 to provide a method of quickly processing a subsequent call to the same terminating CD 202. In one embodiment, if the ENUM server 550 finds the NAPTR record in the cache memory 552 in step 1008, then the ENUM server 550 retrieves the NAPTR from the cache memory, in step 1012, and then returns the NAPTR in a response to the CSCF server 206 in step 1044.

If the ENUM cache memory 552 does not contain the NAPTR for the telephone number, then the ENUM server 550 can transmit a request to a Domain Name System (DNS) server 505, in step 1028, for an identity of a regional NAPTR server 515-555 that contains the requested NAPTR. In one embodiment, the DNS server 505 can provide identities for any regional name pointer server 515-555 in a nationwide system. In one embodiment, the DNS server 505 can determine which geographic region of the system corresponds to the geographic area associated with the telephone number. For example, if the NPA telephone number is within the first geographic region, then the DNS server 505 can respond by returning an identity for the correct regional NAPTR Server 515 to the ENUM server 550, in step 1032. In one embodiment, the ENUM server 550 can then request the NAPTR for the telephone number from the regional NATPR server 515 for the correct geographic region, in step 1036. In one embodiment, the regional NAPTR server 515 can respond with the requested NAPTR, in step 1040 that can then be forwarded to the CSCF server 206 that made the initial request, in step 1044.

Upon reviewing the aforementioned embodiments, it would be evident to an artisan with ordinary skill in the art that said embodiments can be modified, reduced, or enhanced without departing from the scope and spirit of the claims described below. For example, in one embodiment, the telephone number can be encoded as an E164 address. In one embodiment, the DNS server 505 can resolve name server identities that are subdomains of a top level domain of 1.e164.arpa. In one embodiment, one or more of the regional NAPTR servers 515-555 can include mirror images of the NAPTR data base.

In another embodiment, the ENUM cache memory 512-552 can store the returned NAPTR records indefinitely, using a first-in, first-out method to remove the oldest records whenever the cache memory space is filled. In another embodiment, the subscriber server 130 can update the DNS 505 and any relevant regional NAPTR server 515-555 whenever a new subscriber telephone number or IP address is added or changed.

FIG. 8 depicts an exemplary diagrammatic representation of a machine in the form of a computer system 800 within which a set of instructions, when executed, may cause the machine to perform any one or more of the methods discussed above. One or more instances of the machine can operate, for example, as the subscriber server 130, media processor 106, CDs 201-205, originating CSCF 206, terminating CSCF 214, HSS 240, ENUM server 230, and other devices of FIGS. 1-4. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor 802 (e.g., a central processing unit (CPU), a graphics processing unit (GPU, or both), a main memory 804 and a static memory 806, which communicate with each other via a bus 808. The computer system 800 may further include a video display unit 810 (e.g., a liquid crystal display (LCD), a flat panel, or a solid state display. The computer system 800 may include an input device 812 (e.g., a keyboard), a cursor control device 814 (e.g., a mouse), a disk drive unit 816, a signal generation device 818 (e.g., a speaker or remote control) and a network interface device 820.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the methods described herein are intended for operation as software programs running on a computer processor. Furthermore, software implementations can include, but are not limited to, distributed processing or component/object distributed processing, parallel processing, or virtual machine processing can also be constructed to implement the methods described herein.

While the tangible computer-readable storage medium 622 is shown in an example embodiment to be a single medium, the term "tangible computer-readable storage medium" should be taken to include a single medium or multiple media (e.g., a centralized or distributed database, and/or associated cache memories and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) are contemplated for use by computer system 800.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, are contemplated by the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
    receiving, by a processing system including a telephone number mapping server in a mapping system, the telephone number mapping server comprising a processor, a first request from a call session control function server for a name authority pointer associated with a telephone number of a call session, wherein the call session control function server and the telephone number mapping server are co-located in a first geographic region, wherein the mapping system comprises a national domain name system server and a name authority pointer database and a plurality of regional name authority pointer servers in communication with the national domain name system server, wherein at least one of the regional name authority pointer servers includes a mirror image of the name authority pointer database;
    searching, by the processing system, according to the telephone number of the first request, by the telephone number mapping server, a plurality of entries stored in a cache memory of the telephone number mapping server to determine if the name authority pointer is stored at the cache memory, each entry of the plurality of entries comprising a name authority pointer transmitted to the telephone number mapping server in accordance with a previous call session;
    if the name authority pointer is stored at the cache memory, then:
        receiving, by the processing system at the telephone number mapping server, the name authority pointer stored at the cache memory; and
        transmitting, by the processing system, the name authority pointer to the call session control function server; and
    if the name authority pointer is not stored at the cache memory, then:
        determining, by the processing system, if the telephone number is local to the first geographic region, and
        if the telephone number is local to the first geographic region, transmitting, by the processing system, a direct request to a local regional name authority pointer server for the name authority pointer without transmitting a request to the national domain name system server; and
        if the telephone number is not local to the first geographic region, then:
    transmitting, by the processing system, a second request to the national domain name system server for an identity of a first regional name authority pointer server of the plurality of regional name authority pointer servers, wherein each regional name authority pointer server of the plurality of regional name authority pointer servers stores name authority pointers associated with a plurality of telephone numbers according to a geographic region, wherein the plurality of regional name authority pointer servers serves geographic regions outside of the first geographic region, and wherein the national domain name system server parses the telephone number for a numbering plan area of the telephone number to determine a geographic region corresponding to the numbering plan area;
    receiving, by the processing system, the identity of the first regional name authority pointer server associated with the telephone number from the national domain name system server according to the second request, wherein the national domain name system server determines the identity of the first regional name authority pointer server according to the geographic region identified by the numbering plan area;
    transmitting, by the processing system, a third request for the name authority pointer to the first regional name authority pointer server according to the identity of the first regional name authority pointer server;
    receiving, by the processing system, the name authority pointer from the first regional name authority pointer server according to receiving the third request;
    transmitting, by the processing system, the received name authority pointer to the call session control function server;
    storing, by the processing system, the received name authority pointer in a group of name authority pointer records in the cache memory,
    monitoring, by the processing system, a remaining storage capacity of the cache memory; and
    deleting, by the processing system, a member of the group based on an oldest record when the cache memory is filled, wherein the oldest record of the group has a longest elapsed time period since the record was retrieved,
    wherein the mapping system is provisioned by a provisioning server that assigns the name authority pointer for a device used in the call session, assigns a unique internet protocol address to the device, and updates the national domain name system server and the first regional name authority pointer server regarding an added telephone number or a changed telephone number.

2. The method of claim 1, further comprising storing, by the processing system, the name authority pointer that is received from the first regional name authority pointer at the cache memory.

3. The method of claim 2, further comprising deleting, by the processing system, the name authority pointer from the cache memory after a storage period expires.

4. The method of claim 1, further comprising:
determining, by the processing system, whether the telephone number is associated with a second geographic region corresponding to a second regional name authority pointer server that is co-located with the telephone number mapping server;
transmitting, by the processing system, a fourth request for the name authority pointer from the second regional name authority pointer server responsive to determining that the telephone number is associated with the second geographic region; and
receiving, by the processing system, the name authority pointer from the second regional name authority pointer server according to the fourth request.

5. The method of claim 1, wherein the telephone number is associated with a terminating device of the call session.

6. The method of claim 1, wherein the name authority pointer comprises a uniform resource identifier associated with the internet protocol address.

7. A device, comprising:
a processing system comprising a processor; and
a memory comprising a cache memory, wherein the memory stores executable instructions that, when executed by the processing system, facilitate performance of operations comprising:
receiving a first request for a name authority pointer associated with a telephone number, wherein the first request is received from a call session control function server for initiating a call session, the call session control function server being co-located with the device at a first geographic region;
searching, according to the telephone number of the first request, a plurality of entries stored in the cache memory to determine if the name authority pointer is stored at the cache memory, each entry of the plurality of entries comprising a name authority pointer stored at the cache memory in accordance with a previous call session;
if the name authority pointer is stored at the cache memory, then:
receiving the name authority pointer from the cache memory; and
transmitting the name authority pointer to the call session control function server for initializing a call session; and
if the name authority pointer is not stored at the cache memory, then:
transmitting a second request for an identity of a first regional name authority pointer server of a plurality of regional name authority pointer servers to a domain name system server, wherein each regional name authority pointer server of the plurality of regional name authority pointer servers stores name authority pointers associated with a plurality of telephone numbers according to geographic region, wherein the plurality of regional name authority pointer servers serves geographic regions outside of the first geographic region, wherein the domain name system server is in communication with a name authority pointer database, and wherein at least one of the regional name authority pointer servers includes a mirror image of the name authority pointer database;
receiving the identity of the first regional name authority pointer server from the domain name system server according to the second request, wherein the domain name system server determines the identity of the first regional name authority pointer server according to a numbering plan area of the telephone number;
transmitting a third request for the name authority pointer to the first regional name authority pointer server according to the identity of the first regional name authority pointer server;
receiving the name authority pointer from the first regional name authority pointer server responsive to transmitting the third request;
storing the received name authority pointer in the cache memory;
monitoring a remaining storage capacity of the cache memory; and
deleting an oldest entry from the cache memory when the cache memory is filled, wherein the oldest entry has a longest elapsed time period since the entry was retrieved,
wherein a mapping system that includes the device is provisioned by a provisioning server that assigns the name authority pointer for a communication device used in the call session, assigns a unique internet protocol address to the communication device, and updates the domain name system server and the first regional name authority pointer server regarding an added telephone number or a changed telephone number.

8. The device of claim 7, wherein the operations further comprise transmitting the name authority pointer to the call session control function server.

9. The device of claim 7, wherein the operations further comprise storing, at the cache memory, the name authority pointer.

10. The device of claim 9, wherein the operations further comprise deleting the name authority pointer from the cache memory after a storage period expires.

11. The device of claim 7, wherein the domain name system server determines that the first regional name authority pointer server corresponds to a geographic region associated with the telephone number by a method comprising:
comparing a portion of the telephone number to one numbering plan area code associated with a plurality of geographic regions associated with the plurality of regional name authority pointer servers; and
determining that the portion of the telephone number matches the one numbering plan area code.

12. The device of claim 7, wherein the telephone number is associated with a terminating device that is further associated with the call session.

13. The device of claim 7, wherein the name authority pointer comprises a uniform resource identifier associated with the internet protocol address.

14. A machine-readable storage medium comprising executable instructions that, when executed by a processing system including a processor, facilitate performance of operations comprising:
transmitting a first request for an identity of a first regional name authority pointer server of a plurality of regional name authority pointer servers to a national domain name system server responsive to determining that a name authority pointer associated with a telephone number of a call session is not stored in a cache memory of a telephone number server that is co-located with a call session control function server associated with the call session in a first geographic region, wherein the cache memory stores a plurality of entries each comprising a name authority pointer transmitted to the telephone number in accordance with a previous call session, wherein the national domain name server is coupled to a name authority pointer database, and wherein at least one of the regional name authority pointer servers includes a mirror image of the name authority pointer database;

transmitting a second request for the name authority pointer to the first regional name authority pointer server identified by the national domain name system server according to a numbering plan area for the telephone number, wherein the first regional name authority pointer server corresponds to a geographic region associated with the telephone number and identified by the numbering plan area, wherein the first regional pointer server serves a geographic region outside of the first geographic region;

receiving the name authority pointer from the first regional name authority pointer server;

storing the received name authority pointer in the cache memory;

monitoring a remaining storage capacity of the cache memory; and deleting an oldest entry from the cache memory when the cache memory is filled wherein the oldest entry has a longest time period elapsed since the entry was retrieved, wherein a mapping system that includes the telephone number server is provisioned by a provisioning server that assigns the name authority pointer for a device used in the call session, assigns a unique internet protocol address to the device, and updates the national domain name system server and the first regional name authority pointer server regarding an added telephone number or a changed telephone number.

15. The machine-readable storage medium of claim 14, wherein the operations further comprise transmitting the received name authority pointer to the call session control function server.

16. The machine-readable storage medium of claim 14, wherein the operations further comprise receiving the name authority pointer from the cache memory responsive to determining that the name authority pointer is stored in the cache memory.

17. The machine-readable storage medium of claim 14, wherein the operations further comprise deleting, at the cache memory, the name authority pointer after a storage period.

18. The machine-readable storage medium of claim 14, wherein the operations further comprise:
comparing a portion of the telephone number to one numbering plan area code associated with a plurality of geographic regions further associated with the plurality of regional name authority pointer servers; and
determining that the portion of the telephone number matches the one numbering plan area code.

19. The method of claim 1, comprising storing, by the processing system, the identity of the first regional name authority pointer server in the cache memory.

* * * * *